UNITED STATES PATENT OFFICE.

HARRY J. EVERSON, OF LOUISVILLE, KENTUCKY, ASSIGNOR, BY MESNE ASSIGNMENTS, TO BARCO BRASS & JOINT COMPANY, OF CHICAGO, ILLINOIS, A CORPORATION OF ILLINOIS.

FLEXIBLE JOINT.

1,167,355. Specification of Letters Patent. Patented Jan. 4, 1916.

Application filed May 24, 1909. Serial No. 497,974.

*To all whom it may concern:*

Be it known that I, HARRY J. EVERSON, a citizen of the United States, residing at Louisville, in the county of Jefferson and State of Kentucky, have invented a certain new and useful Improvement in Flexible Joints, of which the following is a specification.

This invention relates to flexible joints, and has for its object to provide a new and improved joint of this description.

Figure 1:
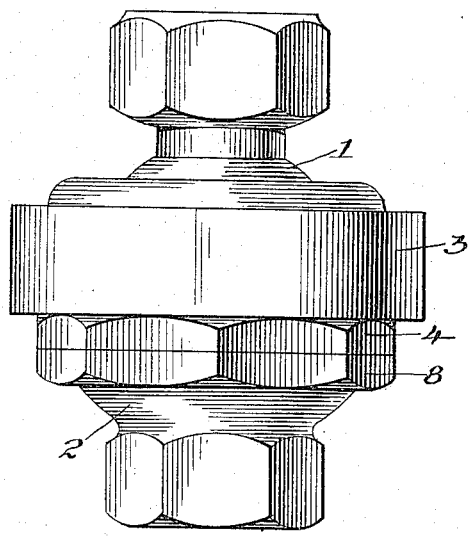
Figure 2:
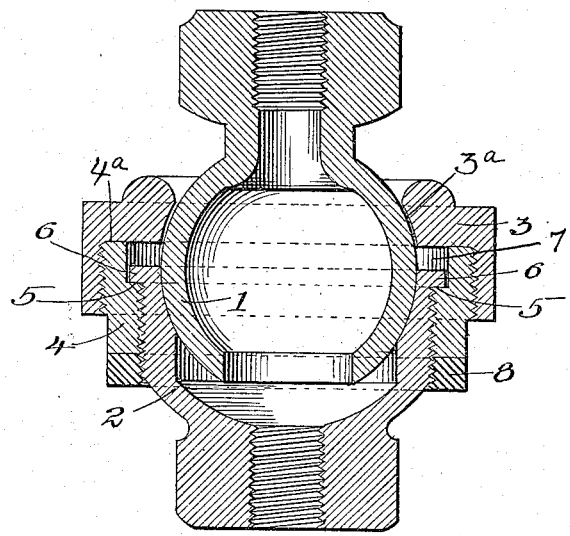

Referring to the accompanying drawings, Figure 1 is a view of one form of joint embodying the invention; Fig. 2 is a sectional view of the joint shown in Fig. 1.

Like numerals refer to like parts throughout the several figures.

One of the objects of this invention is to provide a flexible joint which may be used either as a loose joint or a tight joint, the change from one to the other being easily and quickly made by a simple adjustment and without separating the parts of the joint.

The joint illustrated in the drawing consists of the ball 1, the cup 2, the ring or ball-inclosing part 3, and the adjusting part 4. The parts 3 and 4 are connected so that they normally move together, while the parts 2 and 4 are adjustably connected together. As herein shown, the parts 3 and 4 are connected together by a left-hand thread, while the parts 2 and 4 are connected together by a right-hand thread. When the device is adjusted for a loose joint the parts are preferably arranged so that the parts 3 and 4 have engaging faces in addition to the faces for the screw threads, and the parts 4 and 2 also have such additional engaging faces, the engagement of these faces assisting in preventing the escape of the material passing through the joint. As illustrated, the part 4 is preferably provided with a shoulder 5 which, when the parts are adjusted for a loose joint, is engaged by the projection 6 on the part 2. The end of the part 4 has an engaging face 4ª which engages an opposed face on the part 3. It will thus be seen that when a loose joint is formed, the parts 2, 4 and 3 each have engaging faces at an angle to each other, one set of engaging faces being screw-threaded, and the other plain, the plain engaging faces, as it were, protecting the screw-threaded engaging faces and thus insuring against leakage.

As shown in Fig. 2 the parts are adjusted for a loose joint, and it will be noted that the engaging face 3ª of the part 3 stands away from the face of the ball 1. In this event the pressure of the material forces these faces into proper engagement. When it is desired to form a tight joint the adjusting part 4 is adjusted to move the parts 3 and 2 closer together, thus forming a tight connection between the opposed parts of the ball 1 and the ring 3, and cup 2. In the construction shown in the drawing, this adjustment is secured by rotating the part 4 so as to separate the shoulder 5 and the projection 6. It will thus be seen that any desired pressure between the ball and the opposed parts 3 and 2 may be secured by this adjustment. It will further be seen that an all metal joint is provided by this arrangement, and that the change from a loose to a tight joint is easily and quickly made without separating the parts, and by simply adjusting the adjusting part 4 by means of a wrench, or in any other suitable manner. An adjusting space 7 is provided between the parts 2 and 3 so that proper adjustment can be made, and to also permit adjustment on account of the wearing of the parts.

Some means is preferably provided for preventing accidental turning of the part 4. Any suitable means for this purpose may be used, as, for example, the locknut 8.

In the present construction it will be noted that the ball 1 which is of metal, engages metal faces both on the part 2 and the part 3. When the joint is used for steam, for example, the joint is loose and the pressure of the steam forces the ball against the face of the part 3. When the joint is used for liquids, a tight joint must be secured, and the ball must be in engagement with the metal bearing faces of both parts 2 and 3. Since these faces are metal faces and the ball is of metal, it will be seen that the parts cannot give when pressed together, as when non-metallic gaskets are used, and hence a delicate adjustment is necessary, for otherwise either the pressure between the parts will be such as to interfere with the flexibility of the joint or will be too small to make a liquid-tight joint. By means of the present device this proper adjustment can be easily secured without separating the parts of the joint. This is a very important factor in the use of these devices, because to adjust by taking the joint apart is difficult and causes an excessive loss of liquid as the two ends of the pipe are separated, so that the liquid escapes.

I claim:

1. A flexible joint comprising a ball, a cup, a ball inclosing part, and an intermediate adjusting part, all of said parts overlapping, said intermediate adjusting part having a screw threaded engagement both with said cup and with said ball inclosing part, the end of said adjusting part projecting from between the cup and ball inclosing part, and having an exposed portion which may be engaged to rotate it, whereby the cup and ball inclosing part may be adjusted with relation to each other so as to provide a loose joint or a tight joint without disconnecting the parts of the joint.

2. A flexible joint comprising a ball, a cup, a ball inclosing part, and an intermediate adjusting part, all of said parts of metal, the cup and ball inclosing part having metal engaging faces integral therewith and adapted to engage said ball, said intermediate adjusting part having a screw threaded engagement with said cup and ball inclosing part, the end of said intermediate adjusting part projecting from between said cup and ball inclosing part and having an exposed portion which may be engaged to rotate said intermediate adjusting part so as to adjust said cup and ball inclosing part to provide a loose joint or a tight joint without disconnecting the parts of the joint.

3. A flexible joint comprising a ball, a cup, a ball inclosing part, and an intermediate adjusting part, said intermediate adjusting part having left hand screw threads on one side and right hand screw threads on the other side, one set of screw threads engaging similar threads on the cup, and the other set of screw threads engaging the screw threads on the ball inclosing part, the end of said intermediate adjusting part projecting from between the cup and ball inclosing part and having an exposed portion, by means of which it may be rotated so as to adjust the cup and ball engaging parts with relation to each other and with relation to the ball so as to provide a loose or a tight joint without disconnecting the parts of the joint.

4. A flexible joint comprising a ball, a cup, a ball-inclosing part, an adjusting part having a right-hand screw thread engagement with one of said latter parts, and a left-hand screw thread engagement with the other, said adjusting part also having plain engaging faces which engage said cup and ball-inclosing part.

5. A flexible joint comprising a ball, a cup, a ball inclosing part, and an intermediate adjusting part, said latter part provided on its inner face with a shoulder, a projection on the cup opposite said shoulder and adapted to engage the same under predetermined conditions, said intermediate adjusting part provided on its opposite faces with screw threads, screw threads on the outer face of said cup and on the inner face of said ball inclosing part, which respectively engage the threads on the opposite sides of said intermediate adjusting part, the projection on the cup overlapping the screw threaded connection between the cup and the intermediate adjusting part, the end of the intermediate adjusting part projecting from between the cup and ball inclosing part and having an exposed portion which may be engaged to rotate it to adjust the parts to provide a loose or a tight joint without disconnecting the parts of the joint.

HARRY J. EVERSON.

Witnesses:
ROSE K. ZIMMERMAN,
JOHN F. MEYER.

Copies of this patent may be obtained for five cents each, by addressing the "Commissioner of Patents, Washington, D. C."